US006802528B2

United States Patent
Short et al.

(10) Patent No.: US 6,802,528 B2
(45) Date of Patent: Oct. 12, 2004

(54) AIR BAG CUSHION ENERGY DIVERTER

(75) Inventors: Chris John Short, Dexter, MI (US);
Fred Leslie Sole, Plymouth, MI (US);
Marshall Lawrence Quade, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 10/117,736

(22) Filed: Apr. 5, 2002

(65) Prior Publication Data

US 2003/0189320 A1 Oct. 9, 2003

(51) Int. Cl.[7] ............................................. B60R 21/20
(52) U.S. Cl. .................................................. 280/728.3
(58) Field of Search ............................ 280/728.3, 731

(56) References Cited

U.S. PATENT DOCUMENTS

| 3,884,499 A | | 5/1975 | Oka et al. | |
|---|---|---|---|---|
| 3,944,250 A | | 3/1976 | Wulf et al. | |
| 4,071,187 A | | 1/1978 | LaFleur | |
| 4,097,065 A | | 6/1978 | Okada et al. | |
| 4,111,458 A | | 9/1978 | Okada et al. | |
| 4,532,652 A | | 7/1985 | Herrington | |
| 4,805,930 A | | 2/1989 | Takada | |
| 4,877,264 A | | 10/1989 | Cuevas | |
| 4,903,986 A | * | 2/1990 | Cok et al. ................. | 280/728.2 |
| 5,004,123 A | | 4/1991 | Stoody | |
| 5,007,662 A | | 4/1991 | Abramczyk et al. | |
| 5,013,064 A | * | 5/1991 | Miller et al. .............. | 280/730.1 |
| 5,044,663 A | | 9/1991 | Seizert | |
| RE33,938 E | | 5/1992 | Cuevas | |
| 5,161,776 A | | 11/1992 | Nicholson | |
| 5,219,179 A | | 6/1993 | Eyrainer et al. | |
| 5,234,229 A | | 8/1993 | Gordon | |
| 5,253,892 A | * | 10/1993 | Satoh ......................... | 280/731 |
| 5,280,953 A | | 1/1994 | Wolanin et al. | |
| 5,310,215 A | | 5/1994 | Wallner | |
| 5,332,257 A | | 7/1994 | Rogers et al. | |
| 5,332,259 A | | 7/1994 | Conlee et al. | |
| 5,340,151 A | | 8/1994 | Sato | |
| 5,366,242 A | | 11/1994 | Faigle et al. | |
| 5,398,960 A | | 3/1995 | Ravenberg et al. | |
| 5,439,032 A | | 8/1995 | Petrone | |
| 5,478,111 A | | 12/1995 | Marchant et al. | |
| 5,484,561 A | * | 1/1996 | Weber et al. .............. | 264/46.4 |
| 5,492,364 A | | 2/1996 | Anderson et al. | |
| 5,531,476 A | | 7/1996 | Kerner | |
| 5,603,526 A | | 2/1997 | Buchanan | |
| 5,634,659 A | | 6/1997 | Abraham | |
| 5,647,607 A | | 7/1997 | Bolieau | |

(List continued on next page.)

FOREIGN PATENT DOCUMENTS

| DE | 43 06 615 A1 | 3/1993 |
|---|---|---|
| JP | 408072648 A | 3/1996 |
| JP | 408188112 A | 7/1996 |
| JP | 410076908 A | 3/1998 |
| JP | 02001277992 | 10/2001 |

*Primary Examiner*—Bryan Fischmann
(74) *Attorney, Agent, or Firm*—Gary Smith

(57) ABSTRACT

An air bag module comprising an air bag retainer, an air bag cushion, an inflator, and a cover having a front wall and a side wall connected to the air bag retainer, wherein the air bag cushion normally deploys through the front wall of the air bag cover and wherein the side wall has a weakened area to allow a portion of the side wall to open and allow the air bag cushion to deploy therethrough along a lateral deployment path if an out-of-position occupant exerts an external force against the front wall sufficient to impede normal deployment of the air bag cushion through the front wall. The side wall may include an extendable section that is in a retracted position when the air bag cushion is folded and is movable to an extended position by inflation of the cushion.

9 Claims, 4 Drawing Sheets

U.S. PATENT DOCUMENTS

| | | |
|---|---|---|
| 5,664,802 A | 9/1997 | Harris et al. |
| 5,664,807 A | 9/1997 | Bohmler |
| 5,669,628 A | 9/1997 | Kaufmann et al. |
| 5,681,052 A | 10/1997 | Ricks et al. |
| 5,695,214 A | 12/1997 | Faigle et al. |
| 5,704,639 A | 1/1998 | Cundill et al. |
| 5,743,558 A | 4/1998 | Seymour |
| 5,762,364 A | 6/1998 | Cuevas |
| 5,779,265 A | 7/1998 | Rose et al. |
| 5,813,693 A | 9/1998 | Gordon et al. |
| 5,839,755 A | 11/1998 | Turnbull |
| 5,848,805 A | 12/1998 | Sogi et al. |
| 5,853,192 A | 12/1998 | Sikorski et al. |
| 5,871,231 A | 2/1999 | Richards et al. |
| 5,882,036 A | 3/1999 | Moore et al. |
| 5,887,894 A | 3/1999 | Castagner et al. |
| 5,918,901 A | 7/1999 | Johnson et al. |
| 5,941,557 A | 8/1999 | Mullins, Jr. et al. |
| 5,947,512 A | 9/1999 | Magoteaux et al. |
| 5,967,551 A | 10/1999 | Newkirk et al. |
| 5,988,677 A | 11/1999 | Adomeit et al. |
| 5,997,037 A | 12/1999 | Hill et al. |
| 6,022,046 A | 2/2000 | Isomura et al. |
| 6,053,527 A | 4/2000 | Gans et al. |
| 6,056,318 A | 5/2000 | Braunschadel |
| 6,082,765 A | 7/2000 | Bowers et al. |
| 6,086,096 A | 7/2000 | Link et al. |
| 6,131,943 A * | 10/2000 | Breitweg ................. 280/728.3 |
| 6,142,517 A | 11/2000 | Nakamura et al. |
| 6,158,770 A | 12/2000 | Ryan et al. |
| 6,170,859 B1 | 1/2001 | Kausch |
| 6,179,322 B1 | 1/2001 | Faigle et al. |
| 6,183,003 B1 | 2/2001 | Matsuhashi et al. |
| 6,189,924 B1 | 2/2001 | Hock |
| 6,189,926 B1 | 2/2001 | Smith |
| 6,206,408 B1 | 3/2001 | Schneider |
| 6,206,417 B1 | 3/2001 | Soderquist et al. |
| 6,224,583 B1 | 5/2001 | Perkins et al. |
| 6,241,283 B1 | 6/2001 | Zarazua |
| 6,250,677 B1 | 6/2001 | Fujimura |
| 6,254,121 B1 | 7/2001 | Fowler et al. |
| 6,254,129 B1 | 7/2001 | Rink et al. |
| 6,254,130 B1 | 7/2001 | Jayaraman et al. |
| 6,290,257 B1 | 9/2001 | Bunce et al. |

* cited by examiner

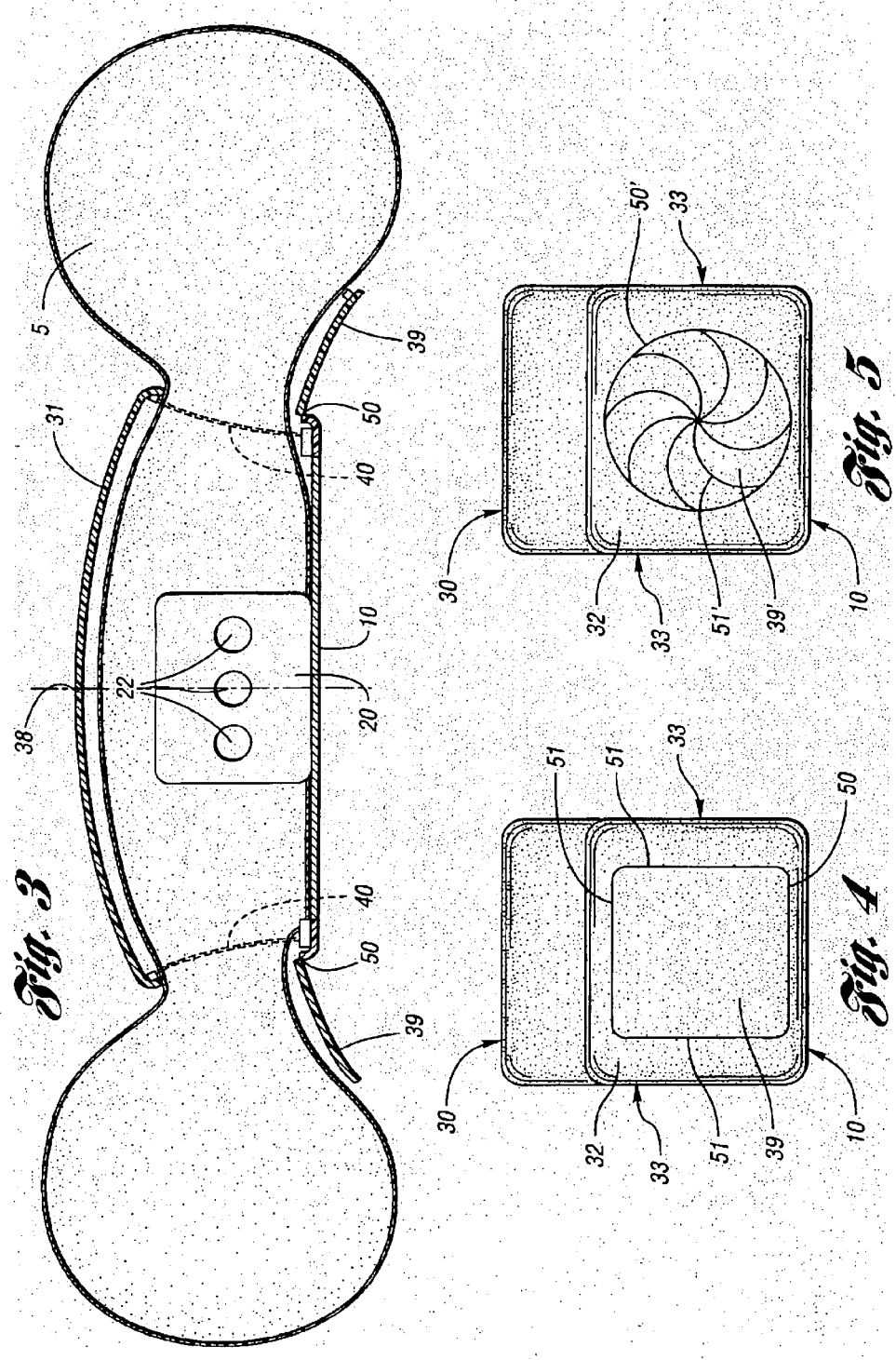

AIR BAG CUSHION ENERGY DIVERTER

BACKGROUND OF THE INVENTION

1. Field of the Invention

This invention relates generally to a passenger vehicle occupant restraint system and, more particularly, to a vehicle occupant restraint system comprising an air bag module which permits deployment of an air bag cushion in an alternative direction.

2. Background Art

Passenger vehicle occupant restraint systems are well known. During an impact of sufficient magnitude, an inflator inflates an air bag cushion which breaks through notches on an air bag cover and inflates inside a vehicle to protect a vehicle occupant. However, under certain conditions the deployed air bag cushion may not perform optimally. In particular, if the occupant is out of position and too close to the passenger vehicle occupant restraint system, the force of the deployed air bag cushion may jolt the occupant and/or not provide optimal protection.

Vehicle occupant restraint systems have been provided with venting means to reduce the pressure of the air bag cushion during deployment to minimize potentially adverse effects due to an out-of-position occupant. While highly effective, the majority of the vented systems require complicated manufacturing and/or sensing systems and do not provide optimal protection when the vehicle occupant is out of position.

Accordingly, it is desirable to provide an occupant restraint system to protect out-of-position occupants in a simple and cost effective method.

SUMMARY OF THE INVENTION

It is an object of this invention to provide a vehicle occupant restraint system comprising an air bag module to protect out-of-position occupants which is not dependent on venting the air bag cushion and/or sensing means.

Accordingly, this invention provides a vehicle occupant restraint system comprising an air bag module which includes an air bag cushion having a folded condition and an inflated condition, an inflator to inflate the air bag cushion, and a cover enclosing the air bag cushion when it is in the folded condition and having a front wall facing the seated occupant and side walls. Under normal crash conditions, such as when the occupant is properly belted, the air bag cushion deploys through the front wall of the air bag cover substantially directly toward the occupant and provides protection to the occupant in a known manner.

However, when the occupant is out of position and is exerting a force against the front wall of the air bag cover sufficient to impede deployment of the cushion through the front wall, pressure builds within the cushion until weakened areas in the side walls of the air bag cover release or rupture to create openings in the cover, thereby providing a lateral deployment path for the inflating cushion. The air bag cushion then surrounds the vehicle occupant and reduces injury potential to the out-of-position vehicle occupant compared to a normally deployed air bag.

BRIEF DESCRIPTION OF THE DRAWINGS

FIG. 3 is a top sectional view of the passenger vehicle occupant restraint system of the present invention wherein the air bag cushion is deployed through the sides of the air bag cover;

FIG. 4 is a side view of the passenger vehicle occupant restraint system of the present invention;

FIG. 5 is a side view of the passenger vehicle occupant restraint system of the present invention showing a different hinge and notch pattern;

DETAILED DESCRIPTION OF THE PREFERRED EMBODIMENTS

Figure 1:
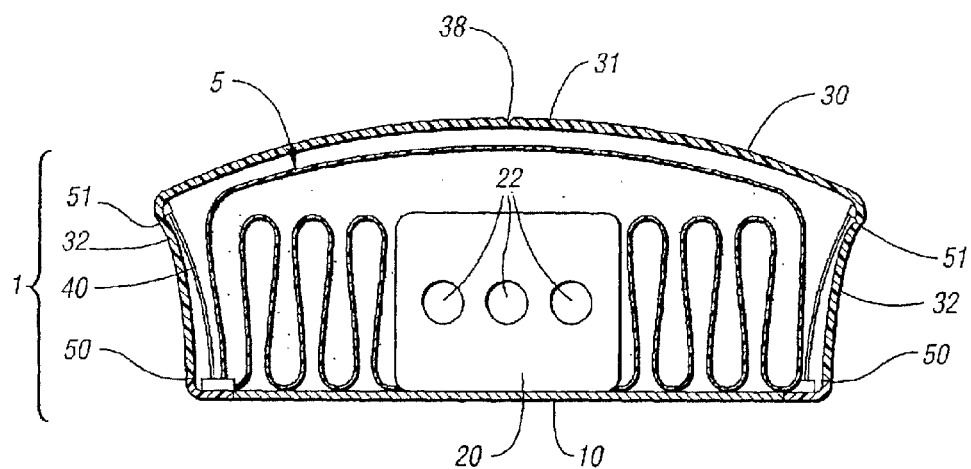
FIG. 1 is a top sectional view of the passenger vehicle occupant restraint system of the present invention in its pre-deployed condition.

Referring now to FIG. 1, a passenger vehicle occupant restraint system comprising an air bag module 1 is shown in its pre-deployed condition. An air bag retainer 10 is attached to some vehicle structure (not shown) in a known manner such that the air bag cushion 5 deploys towards a vehicle occupant (not shown). In the case of a driver's side vehicle occupant restraint system, air bag retainer 10 is generally attached to the steering column. The system of the present invention can also be installed to other parts of the vehicle to offer, for example, side impact protection and protection to other vehicle occupants. The air bag cushion 5 is generally stored in a folded state to minimize storage requirements.

Inflator 20 is provided for inflating air bag cushion 5 during a crash of significant magnitude as determined by crash sensor (not shown) disposed on the vehicle (not shown). Inflator 20 comprises a plurality of inflating gas discharge ports 22 which discharge gas to inflate the air bag cushion 5 in a known manner.

Figure 2:
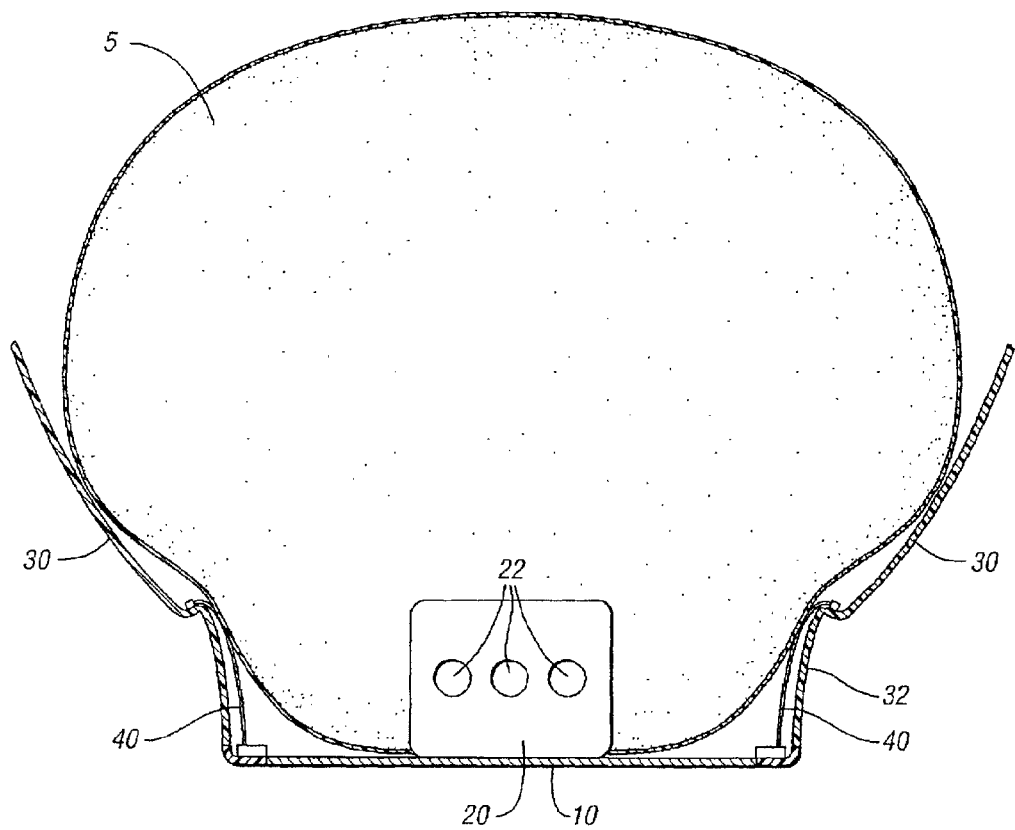
FIG. 2 is a top sectional view of the passenger vehicle occupant restraint system of the present invention in its normal deployed condition.

An air bag cover 30 having a front wall 31 and side walls 32 attaches to air bag retainer 10 in a known manner and encloses the air bag cushion 5 and inflator 20. The air bag cover 30 may be circular having only one continuous, circular side wall, or polygonal having multiple, generally flat side walls. The air bag cover 30 may be made out of polypropylene, a thermoplastic elastomer such as DYM available from Dupont, or a thermoplastic olefin. Cover 30 has at least one deployment notch 38 in front wall 31. More deployment notches 38 may be used for optimal performance. During normal air bag cushion deployment, the deployment notch 38 tears or splits to create a normal deployment path for the air bag cushion 5 directly through the front wall 31, substantially straight toward the vehicle occupant as shown in FIG. 2.

Referring to FIGS. 3–5, the air bag cover 30 is shown having opposing pairs of side walls 32 and 33. In the embodiment shown in FIGS. 3 and 4, breakaway hinges 50 and diverter notches 51 on the side walls 32 define a weakened area providing an alternative, lateral deployment path of air bag cushion 5. When an external force is applied on the outside surface of the front wall 31 during air bag inflation, such as by an out-of-position occupant pressing against the cover, the external force obstructs and slows the normal air bag cushion deployment through the front wall 31. As the external force prevents the inflating air bag from following the normal deployment path, pressure builds within the cover 30 to a level sufficient to cause diverter notches 51 on the side walls 32 to split so that doors 39 defined by the hinges 50 and notches 51 swing outwardly along breakaway hinges 50 as shown in FIG. 3. The open doors 39 provide the lateral deployment path for air bag cushion 5 to expand through the side walls 32. One or more tethers 40 connect air bag cover 30 to air bag retainer 10 or to other parts of the air bag cover to restrain the air bag cover and prevent it from acting as a projectile or otherwise causing injury. Tethers (not shown) may also be used to help shape the air bag cushion when normally deployed or when deployed through the side walls 32. Tethers 40 may be made out of a nylon web material, cloth, or any other suitable material.

Accordingly, deployment of the air bag cushion 5 is redirected laterally to surround the out-of-position occupant and provide some cushioning in the lateral directions. The air bag cushion may also deploy partially through the front wall 31 if deployment notch 38 ruptures, depending upon how close the occupant is to the front wall at the start of inflation and the amount of external force applied, thereby providing some cushioning in the fore direction while not exerting excessive forces on the out-of-position occupant.

The diverter notches 51 may extend along three sides of the portion of side wall 32 to form a rectangular door 39, as shown in FIG. 4, or may be of any appropriate configuration to form a door of any desired size and shape. The notches 51 may be perforated, molding with thinner sections, or using other methods of creating a weaker line. The hinge 50 may be molded as a living hinge, may be a weakened area, or may merely hinge there based on the force of the air bag cushion 5 or the geometry of the notches 51 and side wall 32.

FIGS. 1–4 show the hinges 50 proximate and parallel to the bottom of the side walls 32 so that doors 39 open downwardly as seen in FIG. 3. However, the hinges 50 can be located proximate the top of side wall 32 so that the doors 39 open upwardly. Further, the diverter hinges 50 could extend perpendicular to the front wall 31 and be designed to open sideways.

The front wall 31 is shown as non-yielding when the air bag cushion 5 diverts through side walls 32. However, the front wall 31 may also feature diverter notches and/or diverter hinges (not shown) to allow the air bag cushion 5 to expand partially therethrough. Further, the front wall 31 may be designed with some "slack" so that it may yield and absorb some energy from the inflating air bag cushion 5.

FIG. 5 shows one alternative configuration of the weakened area that provides the lateral deployment path. The diverter notches 51' are "S-shaped" and extend inwardly form a circular breakaway hinge 50'. The portion of the side wall 32 that breaks away comprises a plurality of swirled pie-shaped pieces 39' creating a round opening.

The performance of the passenger vehicle occupant restraint system of the present invention can be tuned by varying, for example, the inflator gas pressure, the folding of the air bag cushion 5, the geometry of deployment notch 38 of the air bag cover 30, and the geometry of hinges 50 and diverter notches 51 that form the openings in the side walls 32. The air bag cushion 5 must be folded properly to allow expansion from both the sides and top. The system can be designed to divert the air bag cushion 5 to the lateral deployment path only when a substantial amount of force is applied to the air bag cover, such as when the occupant is leaning against the cover. Further, the air bag cushion could be diverted to the lateral deployment path not just at the start of cushion inflation, but also at later stages of deployment. For example, if the occupant is very close to the front wall 31 but not actually touching it at the instant the air bag cushion begins to inflate, the cushion may begin to deploy normally through the front wall. But as the inflating cushion and/or the front wall comes into contact with the occupant, the force exerted by the occupant will inhibit further expansion along the normal deployment path so that pressure builds in the cushion. This will cause the diverter notches 51 to rupture so that the air bag cushion may still be able to be at least partially diverted to the lateral deployment path if a predetermined pressure is reached.

Figure 6A:
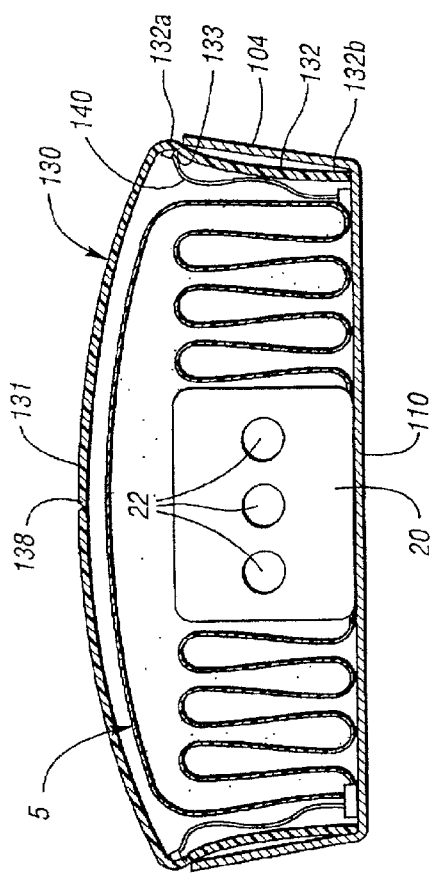
FIG. 6a is a top sectional view of a second embodiment of the passenger vehicle occupant restraint system of the present invention in its pre-deployed condition.
Figure 6B:
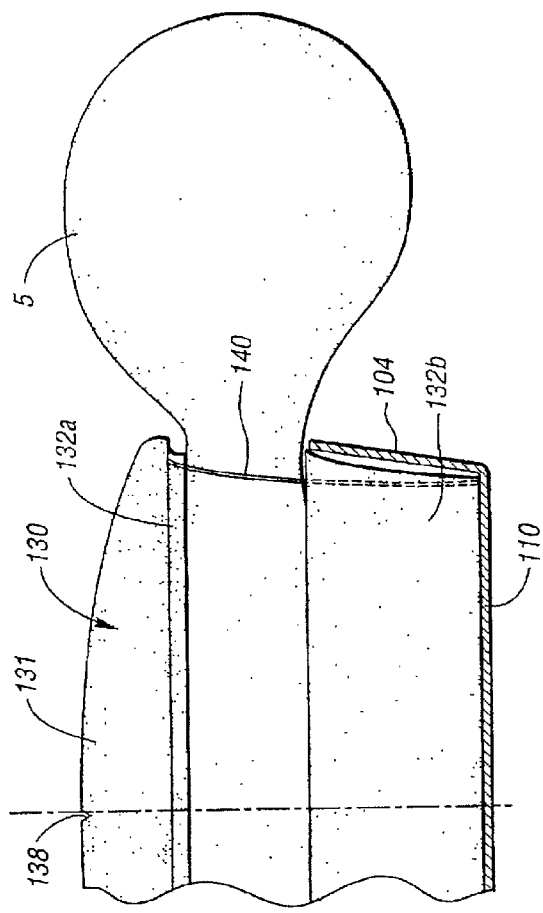
FIG. 6b is a top view of the second embodiment of the invention wherein the air bag cushion is deployed through a lateral deployment path.

In a second embodiment of the invention shown in FIGS. 6a and 6b, the air bag module is enclosed by a retaining structure comprising a base plate 110 and rigid side panels 104 that extend upwards to cover a substantial portion of the bag cover side walls 132. This may be the case, for example, for an air bag module mounted on a steering wheel and enclosed by a backing plate and spokes of the wheel. As is apparent from viewing FIG. 6a, the side panels 104 would obstruct a lateral deployment path formed directly through the side walls 132 in a manner similar that disclosed in the first embodiment of the invention.

The air bag cover 130 comprises a front wall 131 with at least one deployment notch 138 and the side wall 132 has a peripheral tear seam 133 extending partially or completely around the side wall to define a weakened area in the side wall. Tethers 140 connect the front wall 131 and/or an upper side wall portion 132a to a retainer 110 and/or a lower side wall portion 132b.

The tear seam 133 is stronger than the deployment notch 138 so that under normal deployment conditions, the deployment notch tears and the tear seam remains intact, allowing the air bag cushion 5 to deploy through the front wall 131 along the normal deployment path, substantially as shown in FIG. 2.

However, when external force is applied to the air bag cover 130 by, for example, an out-of-position occupant, thereby inhibiting expansion of the cushion 5 along the normal deployment path, the pressure within air bag cushion 5 causes the weakened area provided by tear seam 133 to burst and the entire front wall and upper side wall portion 132a to move toward the occupant until they are restrained against further movement by tethers 140, as shown in FIG. 6b. The resulting gap between the front wall 131 and the side panel 104 provides a lateral deployment path through which air bag cushion 5 expands.

The initial movement of the front wall 131 toward the occupant is less likely to cause injury to the occupant than a normal deployment of the air bag cushion for two reasons. First, the force of the inflating cushion is spread out over the full area of the front wall 131, thus reducing the concentrated point load that would otherwise be applied to the occupant. Second, the tethers 140 limit the distance that the front wall 131 is able to move.

As described above, diverter notches and diverter hinges may also be used on the side wall 132 to further provide a lateral deployment path for the air bag cushion 5.

Figure 7:
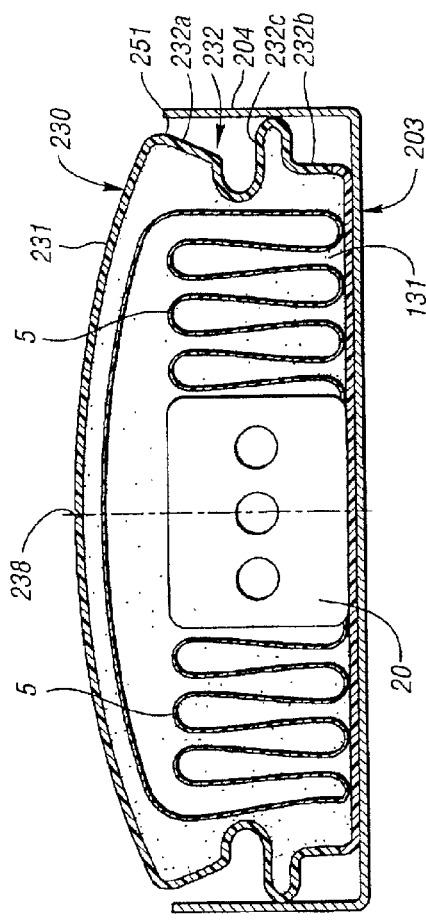
FIG. 7 is a sectional view of a third embodiment of the passenger vehicle occupant restraint system of the present invention in its pre-deployment condition.
Figure 8:
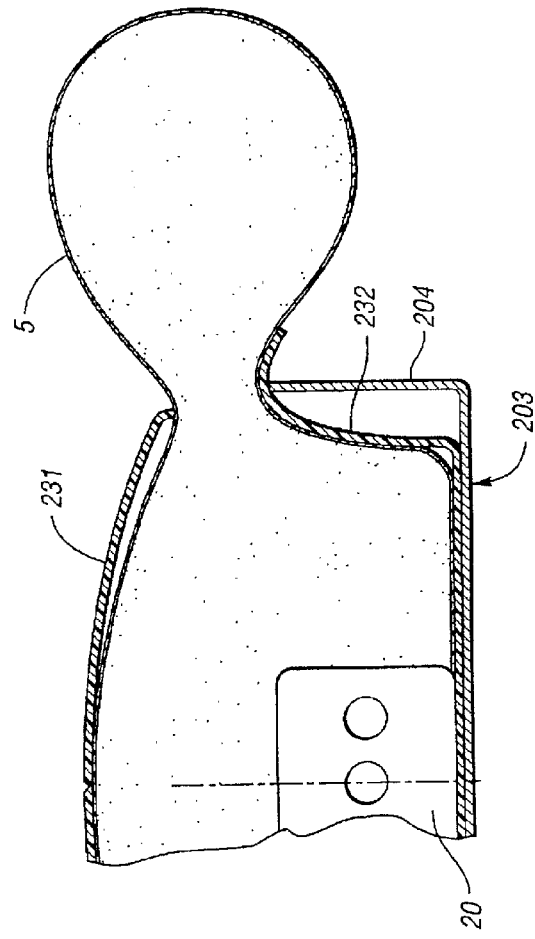
FIG. 8 is a sectional view of the third embodiment wherein the air bag cushion is deployed through a lateral deployment path.

A third embodiment of the invention depicted in FIGS. 7 and 8 is also directed toward use when the air bag module is enclosed by a retaining structure having rigid side panels 204 that would obstruct a lateral deployment path formed directly through the side walls 232. To overcome this problem, the side walls 232 comprise an upper portion 232a, a lower portion 232b, and an extendable portion 232c connecting the upper and lower portions. Extendable portion 232c comprises extra material which is folded back on itself or otherwise disposed in a retracted condition when the air bag cushion is not inflated. In the depicted embodiment extendable portion 232c takes the form of an "S-fold."

Weakened areas 251 are formed in upper sidewalls 232a. The weakened areas 251 may comprise one or more diverter notches and/or hinges of the type similar to those found in the first embodiment, a tear seam similar to that of the second embodiment, or any appropriate type of structure that will separate or split when subjected to internal pressure to create an opening in the air bag cover 230.

When inflator 20 is triggered and the air bag cushion 5 begins to expand, it initially urges the cover front wall 231 directly toward the seat occupant and the extendable portions 232c move to an extended condition wherein they are substantially taut. When side wall extendable portions 232c are in the extended condition, the weakened areas 251 are located above the top edges of the rigid side panels 204, as seen in FIG. 8. When no external pressure is applied to the front wall 231, continued inflation of the cushion 5 causes it to deploy along a normal inflation path (not shown) through the front wall 231, for example by rupturing of a deployment notch 238.

However, if an out-of-position occupant applies external force to the front wall 231 sufficient to impede further expansion of the air bag cushion 5 along the normal deployment path, pressure builds up inside the cushion 5 until the weakened areas 251, which are no longer obstructed by the side panels 204, separate or split and thereby create a lateral deployment path through which the cushion continues to expand. See FIG. 8. The air bag cushion 5 deploys laterally to avoid subjecting the out-of-position occupant to excessive force, and to surround the occupant and provide some cushioning in the lateral directions.

While the best mode for carrying out the invention has been described in detail, those familiar with the art to which this invention relates will recognize various alternative designs and embodiments for practicing the invention as defined by the following claims.

What is claimed:

1. An air bag module comprising:
   an air bag cushion having a folded condition such that the air bag cushion is folded in a series of pleat folds and an inflated condition;
   an inflator to inflate the air bag cushion; and
   an air bag cover having a front wall and a side wall, the air bag cover enclosing the air bag cushion when in the folded condition such that the series of pleat folds are oriented parallel to the side wall;
   wherein the air bag cushion normally deploys through the front wall of the air bag cover and wherein the side wall has a hinge and at least one notch to allow a portion of the side wall to open and form a lateral deployment path for the air bag cushion to deploy therethrough if external force is exerted against the front wall.

2. The air bag module of claim 1 further comprising a tether connecting the air bag cover to an air bag retainer, the tether adapted to shape the air bag cushion upon deployment.

3. The air bag module of claim 1 wherein the side wall comprises three notches, the hinge and three notches defining a rectangular door that opens to provide the lateral deployment path.

4. The air bag module of claim 1 wherein the air bag cover comprises four side walls configured in two opposing pairs such that each side wall in at least one opposing pair has at least one hinge and at least one notch.

5. The air bag module of claim 1 wherein the front wall comprises at least one deployment notch.

6. An air bag module comprising:
   an air bag cushion having a folded condition such that the air bag cushion is folded in a series of pleat folds and an inflated condition;
   an inflator to inflate the air bag cushion; and
   an air bag cover enclosing the air bag cushion when in the folded condition and having a front wall providing a normal deployment path for the air bag cushion and at least one side wall having a weakened area to provide a lateral deployment path through the side wall if an external force sufficient to impede deployment of the air bag cushion through the normal deployment path is applied to an exterior surface of the front wall;
   wherein the series of pleat folds are oriented parallel to the side wall when the air bag cushion is in the folded condition.

7. The air bag module of claim 6 further comprising a tether connecting the air bag cover to an air bag retainer, the tether adapted to shape the air bag cushion upon deployment.

8. The air bag module of claim 6 wherein the weakened area comprises at least one hinge and at least one notch defining a door that opens to provide the lateral deployment path.

9. The air bag module of claim 6 wherein the air bag cover comprises four side walls configured in two opposing pairs and the weakened area comprises a hinge and three notches defining a rectangular door.

* * * * *